United States Patent
Dance et al.

(10) Patent No.: US 6,943,904 B1
(45) Date of Patent: Sep. 13, 2005

(54) METHOD AND APPARATUS FOR IMAGE CAPTURE, SELECTION AND COPYING

(75) Inventors: Christopher R. Dance, Cambridge (GB); Mauritius Seeger, Royston (GB); Stuart A. Taylor, Cambridge (GB)

(73) Assignee: Xerox Corporation, Stamford, CT (US)

( * ) Notice: Subject to any disclaimer, the term of this patent is extended or adjusted under 35 U.S.C. 154(b) by 998 days.

(21) Appl. No.: 09/708,024

(22) Filed: Nov. 8, 2000

(51) Int. Cl.$^7$ .............................................. G06F 15/00
(52) U.S. Cl. ..................... 358/1.13; 358/1.15; 358/1.18
(58) Field of Search .......................... 358/1.1, 1.5, 1.9, 358/1.13, 1.14, 1.15, 1.18; 382/237, 254, 264, 265, 266, 267, 268

(56) References Cited

U.S. PATENT DOCUMENTS

| | | | |
|---|---|---|---|
| 5,570,432 A | * 10/1996 | Kojima | 382/254 |
| 5,717,501 A | 2/1998 | Iwamoto et al. | 358/468 |
| 5,937,232 A | 8/1999 | Taguchi et al. | 399/81 |
| 6,282,314 B1 | * 8/2001 | Sugiura et al. | 382/173 |
| 6,640,010 B2 | 10/2003 | Seeger et al. | 382/229 |

OTHER PUBLICATIONS

Philips Vesta Pro Scan PCVC609K, Pagecam 2.1 User Guide, Sep. 2000. Available on the internet at: http://www.pc-cameras.philips.com/manual/english/win/pcvc690k/.

William M. Newman and Christopher R. Dance and Alex S. Taylor and Stuart A. Taylor and Michael Taylor and Tony Aldhous, "CamWorks: A Video–Based Tool for Efficient Capture from Paper Source Documents", Proceeding of the International Conference on Multimedia Computing and Systems, vol. 2, pp. "647–653", Jun., 1999.

* cited by examiner

*Primary Examiner*—Mark Wallerson

(57) ABSTRACT

An apparatus and method are described for processing a captured (e.g. scanned) image. The apparatus includes a plurality of selection tools for selecting a region of the image to be processed. The selection tools include a word-by-word selection tool for text and a rectangular box selection tool for a picture. The apparatus also includes a plurality of copy tools for copying the selected region. The appropriate selection tool and copy tool are controlled automatically by a global mode control, being one of a text mode, a color picture mode and a black-and-white picture mode. Optionally, the apparatus displays the image in one of a plurality of different display modes, the display mode also being controlled by the global mode control.

19 Claims, 5 Drawing Sheets

FIG. 1
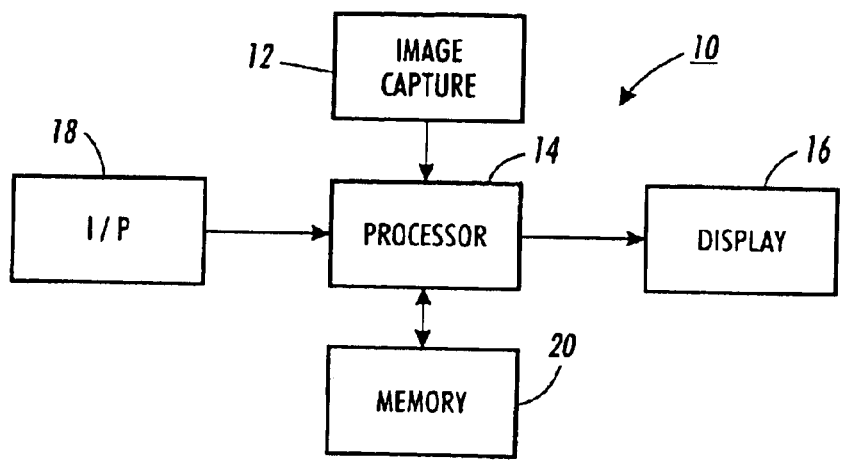
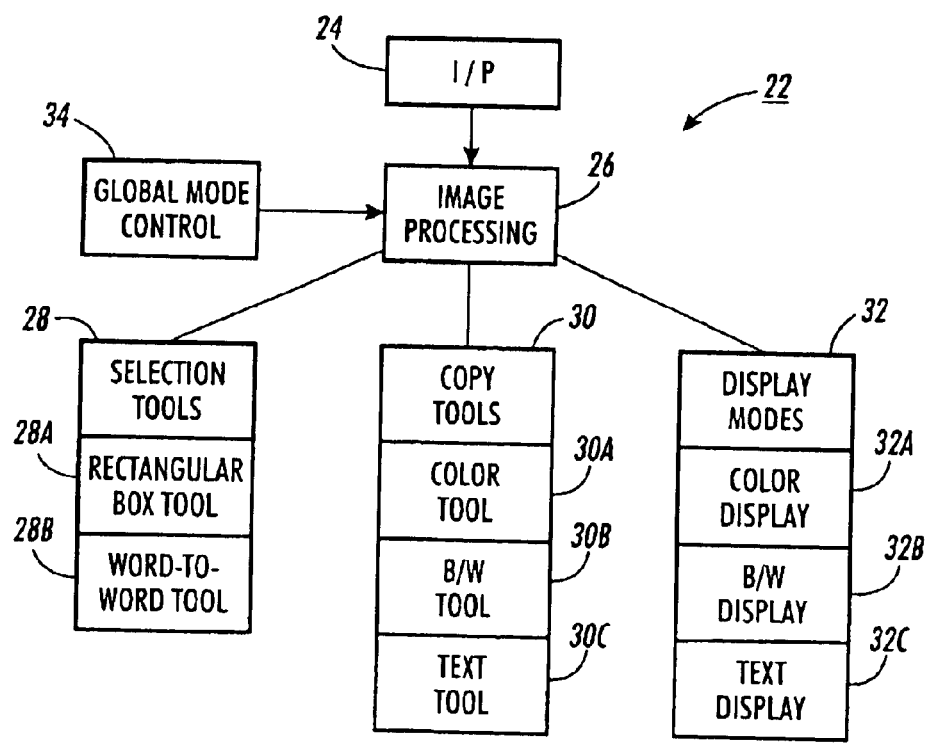
FIG. 2

FIG. 4
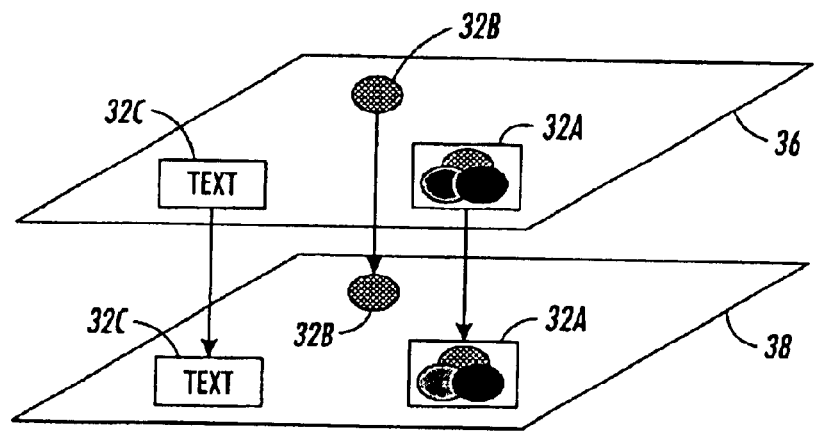
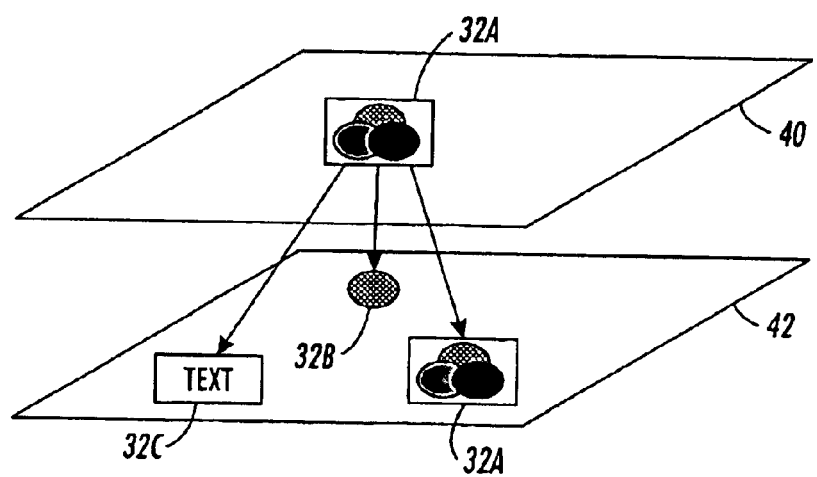
FIG. 5

METHOD AND APPARATUS FOR IMAGE CAPTURE, SELECTION AND COPYING

BACKGROUND OF THE INVENTION

1. Field of the Invention

The present invention relates to a method and apparatus for use in digital image capture, and which permits a region of the captured image to be selected and copied, for example to a file, or to a computer's "clipboard", or directly into a computer's application program.

2. Description of Related Art

There are many known apparatus and application programs for capturing a digital image of, for example, a document or photograph or scene. Such apparatus and programs will often have a display facility for displaying the captured image, a selection facility for enabling a region of the image to be controllably selected, and a copy facility for enabling the selected region to be copied to a tile, or to a temporary "clipboard", or directly into an application program.

An example of such an application program is CamWorks 4.2 produced by Xerox Corporation. This application provides plural selection tools for enabling a user to specify how the selection of an image region is to be performed, to suit the particular image characteristics. For example, for a picture image, then a suitable selection tool is a rectangular box selection tool, where the user defines a rectangular boundary around the selected region.

The CamWorks 4.2 application also includes plural copying tools for enabling the selected region to be copied to a target location, file or application. Each time that copying is performed, the user has to specify the particular copy tool to be used, for example, "copy as text", "copy as a color image", or "copy as a black and white image". This controls how the image data is processed, and the type of file generated.

Reference is made to the operations manual for CamWorks 4.2, the content of which is incorporated herein by reference, to provide technical information about the operation of the selection and copying tools.

As indicated above, many other forms of image capture apparatus and application programs are known in the art. Reference may be made, for example, to U.S. Pat. No. 5,715,501 which relates to a digital copier, and to U.S. Pat. No. 5,937,232 which relates to image processing.

SUMMARY OF THE INVENTION

Broadly speaking, one aspect of the present invention is to provide image control modes which control, at least in a default situation, a selection tool for selecting a region of an image, and a copying tool for copying the selected region of the image.

The control mode may be regarded as a global mode for controlling the choice of selection tools automatically. This requires minimal user input, and allows consistent repeated actions.

Preferably, the modes include at least one text mode, and at least one picture mode. Preferably the picture modes include a black-and-white (monochromatic) picture mode, and a color picture mode.

By using modes, the most suitable selection tool and the most suitable copying tool are controlled automatically by the image mode selected by the user. It is therefore no longer necessary for the user to select (or check) the selection tool and the copying tool on each occasion of use. Particularly for repetitive situations, such selecting operations are laborious and time consuming, and can lead to mistakes or inconsistent use.

In a preferred embodiment, the image control mode also controls the display of the image, for example, either as a text image, or as a black-and white picture image, or as a color picture image.

BRIEF DESCRIPTION OF THE DRAWINGS

Embodiments of the invention are now described by way of example only, with reference to the accompanying drawings, in which:

FIG. 1 is a schematic block diagram showing the components of an image capture system;

FIG. 2 is a schematic block diagram illustrating the functionality in a first embodiment;

FIG. 4 is a modified schematic illustration of modes in the first embodiment;

FIG. 5 is a schematic illustration of modes in an alternative modified version of the first embodiment;

DETAILED DESCRIPTION

Figure 3:
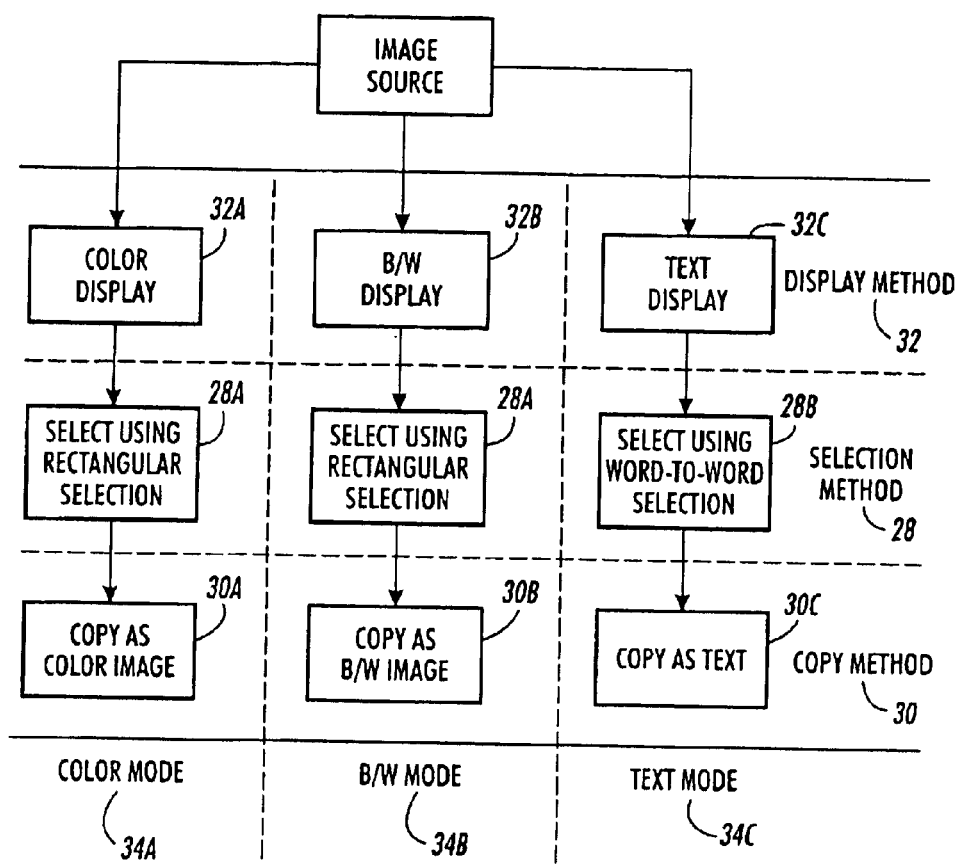
FIG. 3 is a schematic control diagram showing the controls affected by control modes in the first embodiment.

Referring to FIG. 1, an image capture and processing system 10 comprises an image capture device 12, a data processor 14, a display device 16, a manual input device 18. and a data storage memory 20. The image capture device 12 may be any form of digital camera, or scanner, or copier for generating a digital version of a captured image. The processor 14, display device 16, the input device 18 and the memory 20 are typically components of a computer system executing an image processing application program.

FIG. 2 illustrates the functionality of a first embodiment of the image processing application 22. The application includes an image input section 24, and image processing section 26. The application also includes a section of selection tools 28 for enabling a user to define and select a desired region of a captured image. The selection tools 28 include a rectangular box selection tool 28a and a word-by-word (or word-to-word) selection tool 28b. The rectangular box tool selection tool 28a operates by enabling the user to define a rectangular boundary around a desired region. The word-by-word (word-to-word) selection tool 28b operates by performing an optical recognition algorithm to identify word patterns and the spaces between words. The user can then select a region on a word-by-word basis. A suitable word-to-word selection tool is described, for example, in commonly owned U.S. Pat. No. 6,640,010 B2 entitled "Word-to-Word Selection on Images", the content of which is incorporated herein by reference.

The application 22 also includes a section of copy tools 30 for copying a selected region, and outputting copied region to the computer's "clipboard", for temporary storage, or to a file in the memory 20, or directly into another application program running on the computer system. The copy tools include a color picture copy tool 30a, a black-and-white (monochrome) picture image copy tool 30*b*, and a text image copy tool 30*c*. Each copy tool generates data representing the image in a respective format, being respectively a black-and-white format, or a color format, or a text format.

In this embodiment, the application also includes control of a display mode 32, including a color display mode 32*a*, a black-and-white display mode 32*b*, and a text display mode 32*c*. The display mode represents the type of display generated on the display device 16. The color display mode 32*a* is typically a picture mode with a color attribute enabled. The black-and-white display mode 32*b* is typically a binary picture mode (e.g. black or white with no intermediate gray values). Alternatively, the black-and-white display mode could be monochromatic with a gray scale (i.e. color disabled). The text display mode 32*c* may be a mode following optical character recognition (OCR) of the input image.

In accordance with the principles of the invention, the application 22 also includes an image mode input 34, which is set by the user to indicate the type of image captured. The image mode may be selected from the following:

(a) color picture mode
(b) black-and-white picture mode
(c) text mode

The image mode 34 is used to control, at least by default, predetermined selections of the display mode 32, the selection tool 28 and the copy tool 30*c*.

Referring to FIG. 3, when the color mode 34*a* is selected, this sets the display mode 32 to be the color display 32*a*, the selection tool 28 to be the rectangular box selection tool 28*a*, and the copy tool 30 to be the color copy tool 30*a*.

When the black-and-white mode 34*b* is selected, this sets the display mode 32 to be the black-and-white display mode 32*b*, the selection tool 28 to be the rectangular box selection tool 28*a*, and the copy tool 30 to be the black-and-white copy tool 30*b*.

When the text mode 34*c* is selected, this sets the display mode 32 to be the text display mode 32*c*, the selection tool to be the word-by-word selection tool 28*b*, and the copy tool 30 to be the text copy tool 30*c*.

It is possible to provide the user with a manual override facility to modify the default settings to suit a particular situation, but the use of an overall mode control setting simplifies operation of the system. This is especially advantageous for highly repetitive applications, and can provide for more efficient operation and control. The risk of accidental selection mistakes, or ambiguous copy results, can be significantly reduced.

FIG. 4 illustrates a modified embodiment in which the application program provides two display outputs, a first being a real-time live display output 36, and the second being a frozen or "captured", display output 38. In FIG. 4, both of the display outputs 36 and 38 are operable in a color picture mode, a black-and-white picture mode, and a text display mode. The image mode 34 is used to control the display mode for both outputs 36 and 38.

In FIG. 4, a real-time or "live", text display mode is indicated. This may be facilitated if binarisation and OCR can be performed fast enough to appear responsive to changes in the images supplied by the camera. Otherwise, it may be possible to track movements of a document in the camera images and to change the position of the displayed text (which allows reuse of the previous OCR results).

The display operation illustrated in FIG. 4 can ensure that a document image is always displayed in both the live view and the frozen view, in the best mode for the document (as set by the control mode 34 selected by the user).

FIG. 5 illustrates a further modified embodiment in which the application program again provides two display outputs, the first being a live display output 40, and the second being a frozen or captured display output 42. The 10 outputs 40 and 42, are similar to the outputs 36 and 38, respectively, discussed above except that the live output 40 operates only in a fixed, color display mode. This means that the live display output 40 is always a color picture display of the camera image. However, when the user switches to the frozen display output, the frozen image will always be displayed in a best mode for viewing the document (according to the mode control 34 selected by the user). The display operation indicated in FIG. 5 may be suited for applications which do not facilitate real-time OCR for a live text display mode.

Figure 6:
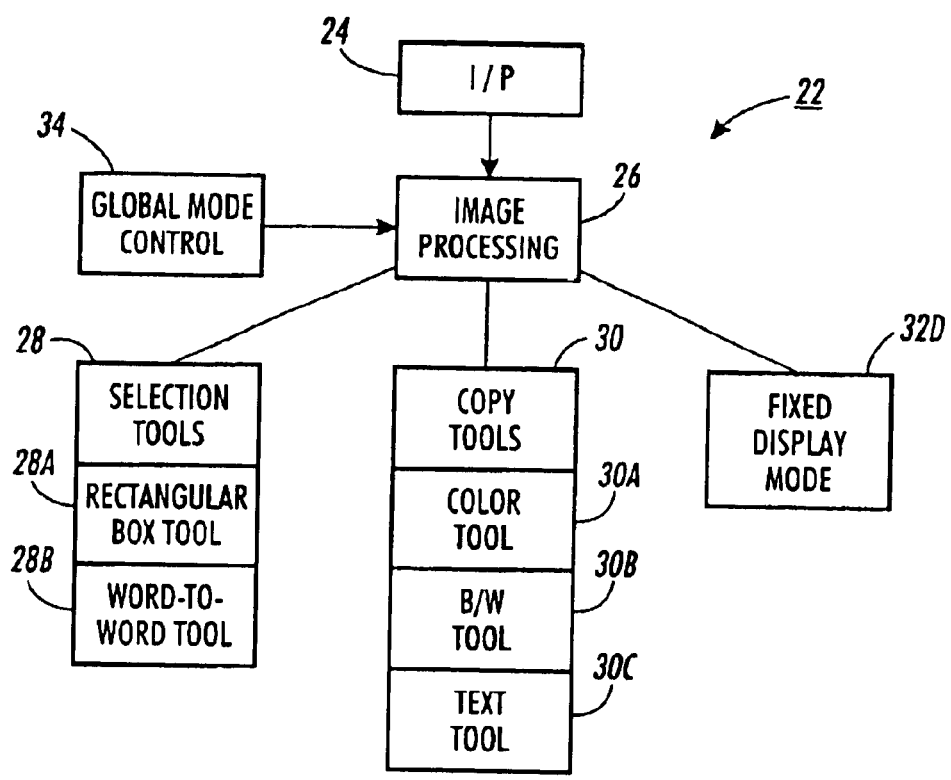
FIG. 6 is a schematic block diagram illustrating the functionality of a second embodiment of the image capture system.
Figure 7:
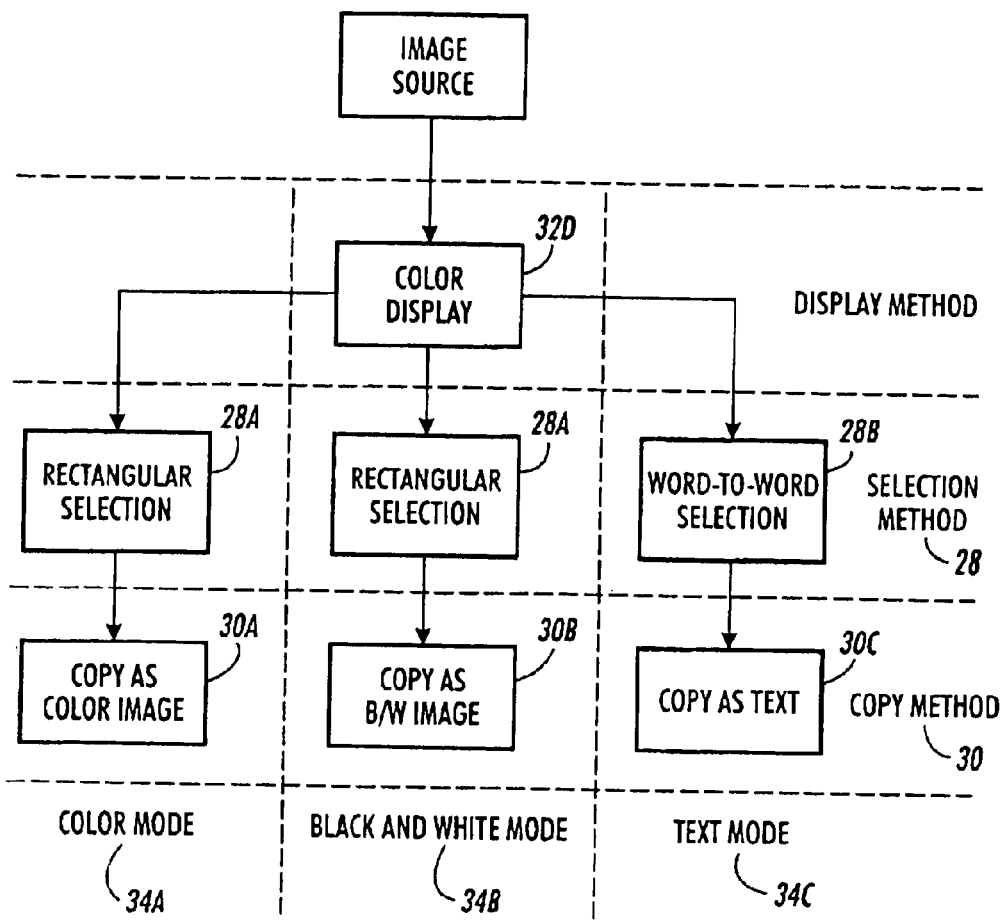
FIG. 7 is a schematic control diagram showing the controls affected by control modes in the second embodiment.

FIGS. 6 and 7 illustrates the functionality for a second embodiment. The same reference numerals used in FIGS. 6 and 7 to denote features equivalent to those described above. The functionality is similar to that of the first embodiment, except that a simplified display 32*d* is used having only a color picture display mode. Therefore, the output from the display is not controlled by the image mode control 34. However, the mode control 34 still controls which selection tool 28 and which copy tool 30 are used to suit the document, and to simplify operation by the user.

It will be appreciated that the invention, particularly as illustrated by the preferred embodiments, can allow a clear and easy understanding of the user interface for a scanning tool. The displayed image can be well correlated with the information that is copied from the application to the computer's clipboard, or to a file. This can increase the productivity and usefulness of the scanning tool.

It will also be appreciated that the foregoing description is merely illustrative of preferred embodiments of the invention, and that many modifications may be made within the scope and spirit of the invention.

What is claimed is:

1. An apparatus for processing a captured image frame, the apparatus comprising:
    a plurality of user-selection tools for enabling a user to select a region of the captured image frame, the user-selection tools including at least one picture region selection tool and at least one text region selection tool;
    a plurality of user-copy tools for copying the selected region of the captured image frame, the user-copy tools including at least one picture copy tool and at least one text copy tool; and
    a mode control for controlling operation of the apparatus in at least one of a plurality of user selected global operating modes, the user selected global operating modes including at least one picture mode and at least one text mode;
    wherein the mode control automatically selects which of said user-selection tools and which of said user-copy tools are used for processing the captured image frame in accordance with the user selected global operating modes.

2. The apparatus according to claim 1, wherein said user-selection tools include a rectangular box selection tool for a picture image, and a word-by-word selection tool for a text image.

3. The apparatus according to claim 1, wherein said user-copy tools include a color picture copy tool, and a black-and-white picture copy tool.

4. The apparatus according to claim 1, wherein the control modes include a color picture mode and a black-and-white picture mode.

5. The apparatus according to claim 1, further comprising a display and a display driver for generating a visual image of said frame, wherein the at least one of the display and the display driver is operable in a plurality of display modes, the display modes including at least one text mode and at least one picture mode, wherein the display mode is controlled by said mode control.

6. The apparatus according to claim 5, wherein the display modes include a color picture display mode and a black-andwhite picture display mode.

7. The apparatus according to claim 5, wherein the apparatus is operable to generate a live real time image and a frozen image, and said mode control controls the display mode of at least the frozen image.

8. A method for processing a captured image frame, comprising:

providing a plurality of user-selection tools for enabling a user to select a region of the captured image frame, the user-selection tools including at least one picture region selection tool and at least one text region selection tool;

providing a plurality of user-copy tools for copying the selected region of the captured image frame, the user-copy tools including at least one picture copy tool and at least one text copy tool;

receiving user input specifying a mode control selected from a plurality of global mode settings including at least one text mode and at least one picture mode;

automatically selecting which of said user-selection tools and which of said user-copy tools are used for processing the captured image frame based on said mode control.

9. The method according to claim 8, wherein said automatically selecting further comprises automatically selecting a said text selection tool and a said text copy tool when said control mode corresponds to a text mode, and automatically selecting a said picture selection tool and a picture copy tool when said control mode corresponds to a picture mode.

10. The method according to claim 8, wherein said selection tools include a rectangular box selection tool for a picture image and a word-by-word selection tool for a text image.

11. The method according to claim 8, wherein said copy tools include a color picture copy tool, and a black-and-white picture copy tool.

12. The method according to claim 8, wherein the plurality of global mode settings include a color picture mode and a black-and-white picture mode.

13. The method according to claim 8, further comprising controlling operation of a-display in one of a plurality of display modes, the display modes including at least one text mode and at least one picture mode, wherein the display mode is controlled by said mode control.

14. The method according to claim 13, wherein the display modes include a color picture display mode and a black-and-white picture display mode.

15. The method according to claim 8, further comprising automatically selecting a display mode based on said mode control.

16. The method according to claim 8, further comprising generating a live real time image and a frozen image, wherein said mode control controls the display mode of at least the frozen image.

17. A method for processing a captured image frame, comprising:

receiving user input specifying a mode control selected from a plurality of global mode settings including at least one text mode and at least one picture mode;

automatically selecting for the captured image frame one of a plurality of userselection tools based on the user-specified mode control; the user-selection tools including a rectangular box selection tool for a picture image and a word-by-word selection tool for a text image; and automatically selecting for the captured image frame of one of a plurality of user-copy tools based on the user-specified mode control; said user-copy tools including a color picture copy tool and a black-and-white picture copy tool.

18. The method according to claim 17, further comprising automatically selecting for the captured image frame a display mode based on the user-specified mode control.

19. The method according to claim 18, wherein the plurality of global mode settings includes a color picture mode and a black-and-white picture mode.

* * * * *